(12) United States Patent
Yip et al.

(10) Patent No.: US 12,180,093 B2
(45) Date of Patent: Dec. 31, 2024

(54) TEMPERATURE SWING SOLVENT EXTRACTION FOR DESCALING OF FEEDSTREAMS

(71) Applicant: THE TRUSTEES OF COLUMBIA UNIVERSITY IN THE CITY OF NEW YORK, New York, NY (US)

(72) Inventors: Ngai Yin Yip, Summit, NJ (US); Chanhee Boo, Seoul (KR); Kinnari Shah, New York, NY (US); Ian Billinge, New York, NY (US); Robert Winton, Seattle, WA (US); Eliza Dach, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 17/348,139

(22) Filed: Jun. 15, 2021

(65) Prior Publication Data
US 2021/0309540 A1   Oct. 7, 2021
US 2023/0174391 A9   Jun. 8, 2023

Related U.S. Application Data

(63) Continuation of application No. PCT/US2020/033403, filed on May 18, 2020.
(Continued)

(51) Int. Cl.
*C02F 1/26* (2023.01)
*C02F 1/04* (2023.01)
(Continued)

(52) U.S. Cl.
CPC ............. *C02F 1/265* (2013.01); *C02F 1/042* (2013.01); *C02F 1/444* (2013.01); *C02F 1/66* (2013.01);
(Continued)

(58) Field of Classification Search
CPC ....................................................... C02F 1/265
See application file for complete search history.

(56) References Cited

U.S. PATENT DOCUMENTS

| 3,177,139 A | 4/1965 | Kimberlin et al. |
| 4,879,042 A | 11/1989 | Hanson et al. |
| (Continued) |

FOREIGN PATENT DOCUMENTS

| CN | 105152490 | 9/2015 |
| WO | 2019015222 A1 | 1/2019 |
| WO | 2019058363 A1 | 3/2019 |

OTHER PUBLICATIONS

International Search Report and The Written Opinion of the International Searching Authority, International Application No. PCT/US2020/033403, dated Sep. 30, 2020.
(Continued)

*Primary Examiner* — Peter Keyworth
(74) *Attorney, Agent, or Firm* — Barclay Damon LLP; Anthony P. Gangemi

(57) ABSTRACT

Systems and methods of performing temperature swing solvent extraction (TSSE) descaling of produced water and desalination of high-salinity brines, e.g., those having a total dissolved solids (TDS) greater than about 250,000 ppm are capable of producing descaled water products including less than about 5% weight percent TDS. The brine/produced water feedstreams and combined with a solvent having temperature-dependent water solubility at a temperature $T_L$. Water is extracted from the feedstream into the solvent to form a water-in-solvent extract component and a raffinate component, from which a solid phase can be precipitated as more water is portioned in the solvent and basicity increases. Heating of the water-in-solvent extract component reduces the solubility of the water therein, producing a biphasic mixture of dewatered solvent and descaled water that can be
(Continued)

separated. Because these systems and methods do not require a phase change of water, these products are achieved with significantly higher energy efficiencies when compared to evaporation-based thermal methods.

5 Claims, 9 Drawing Sheets

Related U.S. Application Data

(60) Provisional application No. 62/848,624, filed on May 16, 2019, provisional application No. 62/904,723, filed on Sep. 24, 2019, provisional application No. 63/024,954, filed on May 14, 2020, provisional application No. 63/134,826, filed on Jul. 7, 2021.

(51) Int. Cl.
    C02F 1/44      (2023.01)
    C02F 1/66      (2023.01)
    C02F 103/08       (2006.01)
    C02F 103/10       (2006.01)

(52) U.S. Cl.
    CPC ...... *C02F 2103/08* (2013.01); *C02F 2103/10* (2013.01); *C02F 2209/02* (2013.01)

(56) References Cited

U.S. PATENT DOCUMENTS

| | | | |
|---|---|---|---|
| 8,695,343 B2 | 4/2014 | Moe | |
| 8,696,908 B2 | 4/2014 | MacLaggan | |
| 9,199,203 B2 | 12/2015 | Yin | |
| 9,428,404 B2 | 8/2016 | Bajpayee et al. | |
| 9,701,558 B1 | 7/2017 | Bader | |
| 10,246,345 B2 | 4/2019 | Lissianski et al. | |
| 10,246,349 B2 | 4/2019 | Cioanta et al. | |
| 10,252,924 B2 | 4/2019 | Kim et al. | |
| 10,301,206 B2 | 5/2019 | Levy et al. | |
| 10,315,936 B2 | 6/2019 | McGinnis et al. | |
| 10,549,237 B2 | 2/2020 | Hu et al. | |
| 2010/0012582 A1 | 1/2010 | Frechen et al. | |
| 2011/0108481 A1 | 5/2011 | Bajpayee et al. | |
| 2014/0263055 A1* | 9/2014 | Govindan | C02F 1/66 210/252 |
| 2015/0166363 A1* | 6/2015 | Eyal | C02F 1/26 210/652 |
| 2015/0175442 A1* | 6/2015 | Dahdah | B01D 3/065 203/1 |
| 2017/0081208 A1 | 3/2017 | Buri et al. | |
| 2020/0023316 A1 | 1/2020 | Briggs | |

OTHER PUBLICATIONS

Boo, C., et al., "Membrane-less and Non-Evaporative Desalination of Hypersaline Brines by Temperature Swing Solvent Extraction," Environmental Science & Technology Letters, vol. 6, pp. 359-364, Apr. 30, 2019.
Boo, C., et al., "Zero Liquid Discharge of Ultrahigh Salinity Brines with Temperature Swing Solvent Extraction," Environmental Science & Technology, vol. 10, pp. 1-21, Jun. 23, 2020.
Yang, Y., et al., "Graphene-Based Standalone Solar Energy Converter for Water Desalination and Purification," ACS Nano, vol. 12, Issue 1, pp. 829-835, Jan. 2018.
Porada, S., et al., "Nickel Hexacyanoferrate Electrodes for Continuous Cation Intercalation Desalination of Brackish Water," Electrochimica Acta, vol. 255, pp. 369-378, Nov. 2017.
Brogioli, D., et al., "Thermodynamic analysis and energy efficiency of thermal desalination processes," Desalination, vol. 428, pp. 29-39, Feb. 2018.
Chen, X., et al., "Unlocking High-Salinity Desalination with Cascading Osmotically Mediated Reverse Osmosis: Energy and Operating Pressure Analysis," Environmental Science & Technology, vol. 52, Issue 4, pp. 2242-2250, Jan. 2018.
Cohen-Tanugi, D., et al., "Water Desalination across Nanoporous Graphene," Nano Letters, vol. 12, Issue 7, pp. 3602-2608, Jun. 2012.
Davison, R.R., et al., "Structure and Amine-Water Solubility in Desalination by Solvent Extraction," Journal of Chemical and Engineering Data, vol. 5, Issue 4, pp. 420-423, Oct. 1960.
Cohen-Tanugi, D., et al., "Multilayer Nanoporous Graphene Membranes for Water Desalination," Nano Letters, vol. 16, Issue 2, pp. 1027-1033, Jan. 2016.
Politano, A., et al., "Photothermal Membrane Distillation for Seawater Desalination," Advanced Materials, vol. 29, Issue 2, 1603504, Jan. 2017.
National Science Foundation, Award #1603314, "Development of Functionalized Nano Carbon Immobilized Membranes for Sea and Brackish Water Desalination," PI: Somenath Mitra, Sponsor: New Jersey Institute of Technology, Sep. 2016.
National Science Foundation, Award #1653631, "Synthetic Mangrove Trees for Passive Desalination and Water Harvesting,", PI: Jonathan Boreyko, Sponsor: Virginia Polytechnic Institute and State University, Mar. 2017.
Davison, R.R., et al., "Thermodynamic Cycles for Recovery of Water by Solvent Extraction," Industrial & Engineering Chemistry Process Design and Development 1964 3 (4), 399-404.
Tong TZ, Elimelech M, "The Global Rise of Zero Liquid Discharge for Wastewater Management: Drivers, Technologies, and Future Directions," Environ Sci Technol Jun. 2016; 50(13): pp. 6846-6855.
Elimelech M, Phillip WA, "The Future of Seawater Desalination: Energy, Technology, and the Environment," Science Aug. 2011, 333(6043): pp. 712-717.
Dow N, Gray S, Li J, Zhang J, Ostarcevic E, Liubinas E, Atherton p. Roeszler G, Gibbs A, Duke, A, "Pilot trial of membrane distillation driven by low grade waste heat: Membrane fouling and energy assessment," Desalination Aug. 2016. vol. 391 pp. 30-42.
Bush JA, Vanneste J, Cath, TY, "Membrane distillation for concentration of hypersaline brines from the Great Salt Lake: Effects of scaling and fouling on performance, efficiency, and salt rejection," Separation and Purification Technology Oct. 2016. vol. 170 pp. 78-91.
Davison RR, Smith WH, Hood DW, "Phase Equilibria of Desalination Solvents: Water-NaCl-Amines," ACS Journal of Chemical & Engineering Data Jul. 1966. vol. 11 / Issue 3 pp. 304-309.
Bajpayee B, Luo T, Muto A, Chen G, "Very low temperature membrane-free desalination by directional solvent extraction," Energy & Environmental Science, Issue 5 Mar. 2011.
Chen W, Chen S, Liang T, Zhang Q, Fan Z, Yin H, Huang KW, Zhang X, Lai Z, Sheng P, "High-flux water desalination with interfacial salt sieving effect in nanoporous carbon composite membranes," Nature Nanotechnology Mar. 5, 2018 vol. 13 pp. 345-350.

\* cited by examiner

TEMPERATURE SWING SOLVENT EXTRACTION FOR DESCALING OF FEEDSTREAMS

CROSS REFERENCE TO RELATED APPLICATION(S)

This application is a continuation-in-part of International Application No. PCT/US2020/033403, filed May 18, 2020, which claims the benefit of U.S. Provisional Application Nos. 62/848,64262/848,624, filed May 16, 2019, 62/904,723, filed Sep. 24, 2019, and 63/024,954, filed May 14, 2020, and this application further claims the benefit of U.S. Provisional Application No. 63/134,826, filed Jan. 7, 2021, which are incorporated by reference as if disclosed herein in their entireties.

STATEMENT ON FEDERALLY SPONSORED RESEARCH OR DEVELOPMENT

This invention was made with government support under R19AC00111 awarded by the United States Bureau of Reclamation. The government has certain rights in the invention.

BACKGROUND

Hypersaline brines from industrial processes are of growing environmental concern, but are technologically underserved by today's desalination methods. Prominent examples of such high-salinity brines include produced water (PW) from the oil and gas industry, waste streams of minimum/zero liquid discharge operations, inland desalination concentrate, landfill leachate, and flue gas desulfurization wastewater.

In many ways, the production of oil and gas from unconventional resources (tight shale) is a water problem. Between several hundred thousand and a million barrels of water are required just to open up hydraulic-induced fractures in a single reservoir to enable the production of hydrocarbons. But more importantly, in regions such as West Texas, once production begins, every barrel of oil produces up to 15 barrels of water, referred to as flowback. Typically, flowback is simply re-injected into the ground using deep well injection. However, this solution to the disposal of PW is increasingly unacceptable as the sheer volume has caused induced seismicity in some regions and the quality of water being injected can create groundwater contamination issues. As a result, the oil and gas industry has become increasingly efficient at reusing PW and avoiding disposal altogether.

These brines and produced waters exhibit very high total dissolved solids (TDS) >60,000 ppm, the removal of which pose considerable technical challenges. The composition of produced water varies considerably, depending on the location of the field, the age of the reservoir, the type of hydrocarbon produced, and other factors. Across the oil and gas industry, the following contaminants are of most concern for PW management: high levels of TDS, which can be as high as 400,000 mg/L, oil and grease, suspended solids, dispersed oil, dissolved and volatile organic compounds, heavy metals, radionuclides, dissolved gases and bacteria, and chemical additives used in production (e.g., biocides, scale/corrosion inhibitors, and emulsion/reverse-emulsion breakers). Reverse osmosis (RO) is the most energy-efficient and cost-effective desalination technique, e.g., for seawater. However, because osmotic pressure scales with TDS concentration, exceedingly high operating pressures are needed to overcome the osmotic pressure of hypersaline brines, precluding the application of RO. As a result, evaporation-based thermal methods, e.g., multiple effect distillation, thermal brine concentrator, and crystallizers, are the prevailing processes to desalinate or dewater highly concentrated brines. These processes achieve separation by phase-change(s) between liquid and vapor water. However, because the enthalpy of vaporization for water is large ($\approx 630$ kWh/m$^3$), these evaporative phase-change methods are inherently very energy intensive.

In order to improve the quantity of produced water and flowback that is useable, either as replacement for fresh water resources that would normally be consumed or for other beneficial uses, new technology is needed to tailor the water quality for specific purposes. This 'fit-for-purpose' water treatment is unlike conventional water treatment or desalination, as the management of PW does not require achieving potable quality. In fact, in most oil basins, flowback water can be recycled with minimal or no treatment. It is in specific applications, e.g., agriculture, where innovative approaches to the removal of contaminants and impurities that would normally render the reuse of produced water uneconomical, is deserving of particular attention.

The removal of TDS in produced water has been identified among the highest priority objectives in PW treatment. However, conventional desalination techniques are precluded from treating most PW because of the high concentrations of scalants and foulants. Specifically, dissolved inorganic compounds can form mineral scales on heat exchange tubes and membranes in distillation and reverse osmosis, respectively, that severely deteriorates productivity. The presence of such scalants in produced water poses a major challenge for the feasibility of beneficial reuse. Without pretreatment, the most likely solids to form, defined by highest saturation index, are: $CaCO_3$, $FeCO_3$, $MgCO_3$, $MnCO_3$, $SrCO_3$, $BaSO_4$, $CaSO_4$, $MgSO_4$, and $SrSO_4$. In order to achieve beneficial reuse and fit-for-purpose reutilization, such scalants should be removed.

The presence of scalants is also a major problem for PW from the Permian Basin, with high concentrations of several metal-sulfate and -carbonate scales in the water chemistry. The high levels of hardness, $Ca^{2+}$, $Mg^{2+}$, and other divalent cations, as well as sulfate and carbonate (alkalinity), point to scaling being a major issue for the treatment of Permian Basin PW. Therefore, the development of cost-effective technologies for scalant removal is urgently needed.

Wastewater management strategies that eliminate liquid waste exiting the facility are termed zero liquid discharge (ZLD), often with the water recovered for reuse. Entirely abating liquid discharge lessens environmental impacts and diminishes pollution risks. The waste solids produced in ZLD can be more easily disposed in leach-proofed landfills or further processed to recover mineral byproducts of value. Where water recovery is applied, a nontraditional supply is generated for fit-for-purpose and even potable use. Increasingly stricter disposal regulations and financial incentives are motivating the development of ZLD technologies for waste brines. For example, all newly constructed coal-to-chemicals facilities in China must comply with ZLD rules for waste streams, to conserve local water resources and ecosystems. Stringent disposal regulations enforced by the Egyptian government to protect their primary water resource, the River Nile, drove implementation of the country's first ZLD-integrated chemical manufacturing facility.

Conventional ZLD systems typically comprise a thermal brine concentrator to dewater the saline feedwater by evaporation to near saturation and a thermal crystallizer to vaporize more water and further concentrate the feed past saturation, precipitating mineral salts and other dissolved solids and contaminants (solar evaporation pond is another option but the method is land and capital intensive and often constrained by climate and hydrogeology). Eventually, almost all the water is removed to leave only a slurry of solids as waste. However, the thermally-driven brine concentrator and crystallizer are evaporative phase change processes with inherently very high energy intensities due to the exceedingly large vaporization enthalpy of water (≈652-682 kWh/m$^3$). Additionally, these methods require high-grade thermal energy, i.e., steam that is >100° C., and often also high-quality electrical energy for mechanical vapor compression.

Solvent extraction is a separation method widely employed for chemical engineering processes. The relatively inexpensive, simple, and effective separation technique is used in a wide range of industries, including production of fine organic compounds, purification of natural products, and extraction of valuable metal complexes. Solvent extraction can be an alternative desalination approach that is radically different from conventional methods because it is membraneless and not based on evaporative phase change. Application of solvent extraction for desalination was first explored using amine solvents in the 1950s, but the effort was limited to desalting brackish water of relatively low salinity (<10000 ppm TDS). More recently, the technique was investigated for desalination of seawater simulated by a 3.5% (w/w) NaCl solution with decanoic acid as the solvent.

SUMMARY

Accordingly, some embodiments of the present disclosure relate to a method of performing temperature swing solvent extraction desalination of high-salinity brines. In some embodiments, the method includes providing a feedstream having a total dissolved solids greater than about 250,000 ppm; combining the feedstream with a solvent, wherein the solvent has temperature-dependent water solubility; bringing the combined feedstream and solvent to a temperature $T_L$; extracting a liquid from the feedstream into the solvent to form a water-in-solvent extract component and a raffinate component at temperature $T_L$, wherein the raffinate component includes an aqueous phase, a solid phase, or combinations thereof; separating the water-in-solvent extract component from the raffinate component; heating the water-in-solvent extract component to a temperature $T_H$ to produce a biphasic mixture of dewatered solvent and descaled water; and separating the dewatered solvent and the descaled water. In some embodiments, the descaled water includes less than about 5% weight percent total dissolved solids. In some embodiments, the feedstream includes brine, produced water, or combinations thereof. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof. In some embodiments, $T_L$ is below about 20° C. In some embodiments, $T_L$ is about 5° C. In some embodiments, $T_H$ is between about 40° C. and about 80° C. In some embodiments, $T_H$ is about 70° C. In some embodiments, the feedstream has a total dissolved solids greater than about 290,000 ppm. In some embodiments, the feedstream to solvent ratio is less than about 15 mL/mol.

In some embodiments, the method includes cooling the dewatered solvent component from temperature $T_H$; and combining the dewatered solvent component with the feedstream. In some embodiments, the method includes precipitating the solid phase; and sieving the solid phase from a liquid phase, the solid phase including one or more scalants from the feedstream. In some embodiments, the one or more scalants includes an alkali metal salts, Ca(OH)$_2$, CaCO$_3$, FeCO$_3$, Mg(OH)$_2$, MgCO$_3$, MnCO$_3$, SrCO$_3$, BaSO$_4$, CaSO$_4$, MgSO$_4$, SrSO$_4$, or combinations thereof.

Some embodiments of the present disclosure relate to a method of producing a descaled water product. In some embodiments, the method includes combining a volume of produced water with a solvent with temperature-dependent water solubility, the volume of produced water having a total dissolved solids greater than about 250,000 ppm; raising the pH of the combined produced water and solvent to produce an elevated-pH composition; precipitating a solid phase from the elevated-pH composition, the solid phase including one or more scalants; separating the one or more scalants from the elevated-pH composition; heating the elevated-pH composition to a temperature $T_H$ to demix a descaled water component from a dewatered solvent component; removing the dewatered solvent component to isolate a descaled water product, the descaled water product including less than about 5% weight percent total dissolved solids; cooling the dewatered solvent component to a temperature $T_L$; and combining the dewatered solvent component with the volume of produced water.

Some embodiments of the present disclosure relate to a system of performing temperature swing solvent extraction desalination of high-salinity brines. In some embodiments, the system includes a feedstream in fluid communication with a fluid source, the fluid source including a fluid having a total dissolved solids greater than about 250,000 ppm. In some embodiments, the system includes a solvent source including one or more solvents with temperature-dependent water solubility. In some embodiments, the system includes an extractor in fluid communication with the feedstream and the solvent source, the extractor including at least a first outlet and a second outlet. In some embodiments, the extractor includes one or more microporous membranes configured to isolate the solid phase product. In some embodiments, the system includes a water-in-solvent extract outlet stream in communication with the first outlet. In some embodiments, the system includes a raffinate outlet stream in communication with the second outlet, wherein the raffinate outlet stream includes an aqueous phase, a solid phase, or combinations thereof. In some embodiments, the system includes a separator in fluid communication with the water-in-solvent extract outlet stream, the separator including at least a third outlet and a fourth outlet. In some embodiments, the system includes a descaled water component outlet stream in communication with the third outlet, the descaled water component including less than about 5% weight percent total dissolved solids. In some embodiments, the system includes a dewatered solvent component outlet stream in communication with the fourth outlet. In some embodiments, the system includes a temperature controller in communication with the extractor and the water-in-solvent extract outlet stream, wherein the extractor is maintained at a temperature $T_L$ and the water-in-solvent extract outlet stream is heated to a temperature $T_H$, wherein $T_L$ is below about 20° C. and $T_H$ is between about 40° C. and about 80° C. In some embodiments, the system includes a dewatered solvent recycle conduit in fluid communication with the dewatered solvent component outlet stream and the extractor, the dewatered solvent recycle conduit configured to direct the dewatered solvent component outlet stream to the extractor. In some embodiments, the system includes one or more heat exchangers in thermal communication with the water-in-solvent extract outlet stream, the separator, or combinations thereof.

Some embodiments of the present disclosure relate to a method of performing temperature swing solvent extraction-stepwise release (TSSE-SR) desalination of hypersaline brines including providing a feedstream including a concentration of dissolved salts, combining the feedstream with one or more solvents, wherein the one or more solvents has temperature-dependent water solubility, bringing the combined feedstream and solvent to a temperature $T_1$, extracting water from the feedstream into the solvent to form a water-in-solvent component and a raffinate component at temperature $T_1$, wherein the raffinate component includes an increased concentration of dissolved salts, separating the water-in-solvent component from the raffinate component, bringing a previous water-in-solvent component produced via a previous separation step to at least one new temperature $T_N$ to produce a biphasic mixture of a subsequent water-in-solvent component and a subsequent raffinate component at temperature $T_N$, separating the subsequent water-in-solvent component from the subsequent raffinate component, bringing a subsequent water-in-solvent component to a temperature $T_F$ to produce a biphasic mixture of dewatered solvent and descaled water, separating the dewatered solvent and the descaled water, and recycling the dewatered solvent to the combined feedstream and solvent. In some embodiments, the feedstream includes brines, produced waters, or combinations thereof. In some embodiments, the steps of bringing a previous water-in-solvent component produced via a previous separation step to at least one new temperature $T_N$ to produce a biphasic mixture of a subsequent water-in-solvent component and a subsequent raffinate component at temperature $T_N$, and separating the subsequent water-in-solvent component from the subsequent raffinate component, is repeated 2 or more times. In some embodiments, the temperature swing from $T_1$ to $T_F$ is a continuous temperature gradient. In some embodiments, the solvent includes aliphatic amines, cyclic amines, pyridines, piperidines, glycol ethers, or combinations thereof. In some embodiments, $T_1$ is below about 20° C. In some embodiments, $T_1$ is about 16° C. In some embodiments, $T_F$ is between about 40° C. and about 80° C. In some embodiments, $T_F$ is about 70° C.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
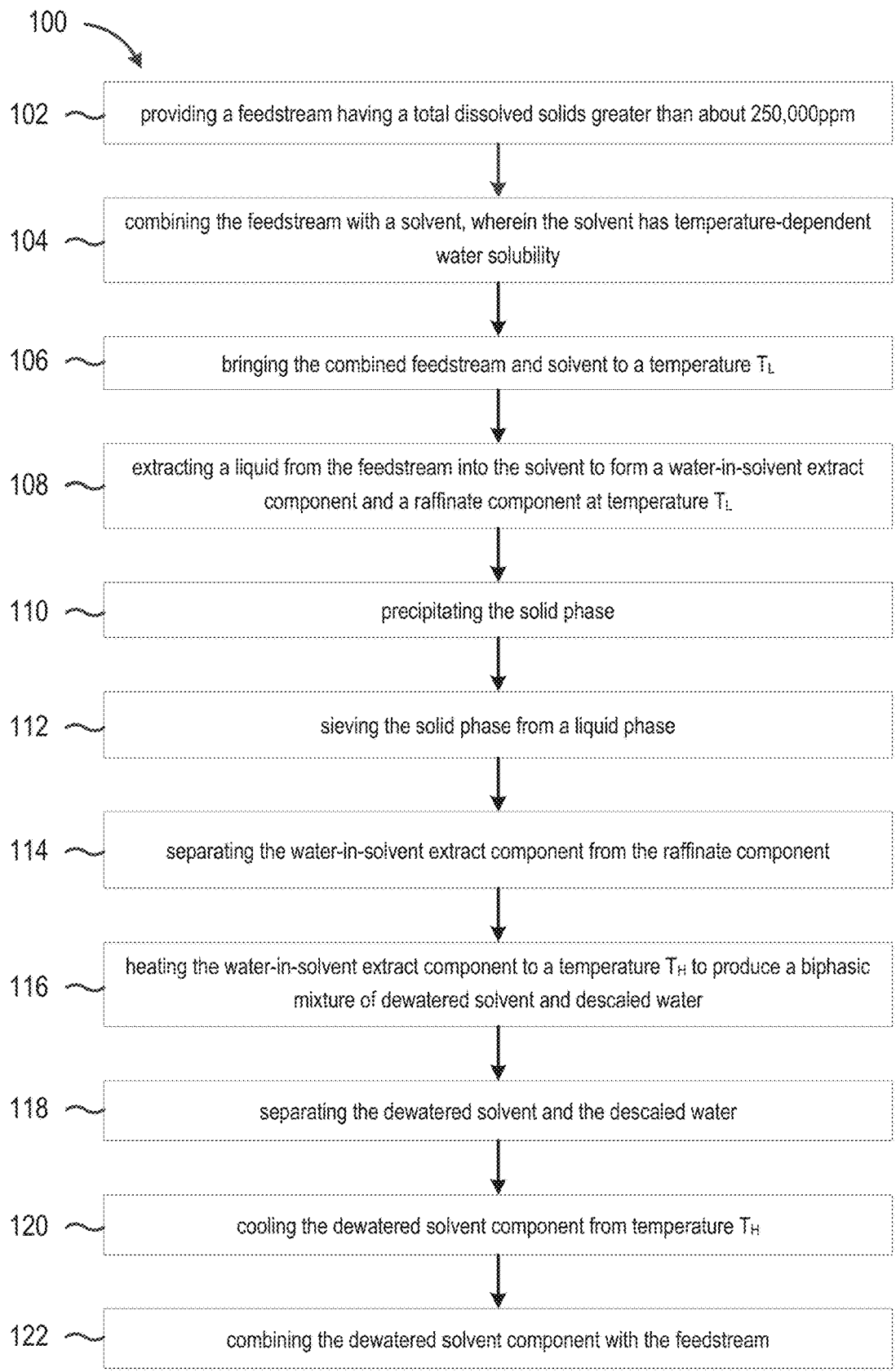
FIG. 1 is a chart of a method of performing temperature swing solvent extraction (TSSE) descaling of a feedstream according to some embodiments of the present disclosure.

Referring now to FIG. 1, some embodiments of the present disclosure are directed to a method 100 of performing temperature swing solvent extraction (TSSE) descaling of a feedstream. In some embodiments, the feedstream includes one or more liquids that include an undesired component dissolved therein. In some embodiments, the undesired component includes one or more scalants, as will be discussed in greater detail below. The feedstream can be from any suitable source, e.g., existing in the natural environment, effluent from industrial processes, etc. In some embodiments, the feedstream includes brines, produced waters, or combinations thereof. In some embodiments, the feedstream includes high-salinity brine, produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof. As used herein, the term "descaling" is used to refer to removal of the undesired components dissolved in the feedstream, i.e., scalants including minerals, metals, etc. In some embodiments, descaling of the feedstream includes removal of one more metal salts, e.g., desalination.

At 102, the feedstream is provided. As discuss above, in some embodiments, the feedstream includes produced water for removal of soluble salt scalants, e.g., produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof. In some embodiments, the feedstream includes a hypersaline solution, e.g., 1M-5M+ NaCl solutions, for desalination. In the some embodiments, the total dissolved solids (TDS) in the feedstream is greater than about 60,000 ppm, 70,000 ppm, 80,000 ppm, 90,000 ppm, 100,000 ppm, 110,000 ppm, 120,000 ppm, 130,000 ppm, 140,000 ppm, 150,000 ppm, 160,000 ppm, 170,000 ppm, 180,000 ppm, 190,000 ppm, 200,000 ppm, 210,000 ppm, 220,000 ppm, 230,000 ppm, 240,000 ppm, 250,000 ppm, 260,000 ppm, 270,000 ppm, 280,000 ppm, 290,000 ppm, 300,000 ppm, etc. In some embodiments, the one or more scalants include minerals, metals, etc., or combinations thereof. In some embodiments, the scalants include hydroxides, carbonates, phosphates, sulfates, etc. In some embodiments, the scalants include $Ca(OH)_2$, $CaCO_3$, $FeCO_3$, $Mg(OH)_2$, $MgCO_3$, $MnCO_3$, $SrCO_3$, $BaSO_4$, $CaSO_4$, $MgSO_4$, $SrSO_4$, alkali metal salts, e.g., NaCl, or combinations thereof.

At 104, the feedstream is combined with one or more solvents. The one or more solvents have temperature-dependent water solubility, meaning that the solubility of water in the solvent decreases with an increase in temperature. In some embodiments, the solvent is basic. In some embodiments, the solvent includes one or more hydrophilic moieties in a mainly hydrophobic chemical structure. In some embodiments, the solvent is an amine solvent, e.g., a primary, secondary, or tertiary amine solvent. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof.

At 106, the combined feedstream and solvent are brought to a temperature $T_L$. In some embodiments, the combined feedstream and solvent are maintained at temperature $T_L$ via any suitable heat source or cooling system, including external heat sources, recycled heat, heat exchangers, etc., as will be discussed in greater detail below. In some embodiments, $T_L$ is below about 20° C. In some embodiments, $T_L$ is below about 10° C. In some embodiments, $T_L$ is about 5° C. In some embodiments, the pH of the combined feedstream and solvent is increased, e.g., via the addition of a basic component, as will be discussed in greater detail below.

At 108, liquid from the feedstream is extracted into the solvent to form a water-in-solvent extract component. In some embodiments, as discussed above, the one or more solvents have temperature-dependent water solubility where water is more soluble in the solvent at $T_L$ than at higher temperatures. Without wishing to be bound by theory, at $T_L$, water from the feedstream favorably interacts with the hydrophilic moieties in the chemical structure of the solvents. Thus, at $T_L$, water favorably partitions from the feedstream into the solvent phase, leaving behind a raffinate component that retains the scalants from the liquid feedstream. In some embodiments, the raffinate component includes an aqueous phase, a solid phase, or combinations thereof.

In some embodiments, at 110, the solid phase is precipitated. In some embodiments, at 112, the solid phase is separated from a liquid phase, e.g., via sieve, membrane, etc. or combinations thereof. The solid phase includes one or more scalants from the feedstream. As the feedstream comes in contact with the solvent, more and more water is extracted into the water-in-solvent extract component, increasing the concentration of scalants/salts in the raffinate component. When the solubility of the scalants/salts is reached, they can precipitate out to form a solid phase in the raffinate component. In some embodiments, the feedstream to solvent ratio is less than about 25.3 mL/mol, 20.2 mL/mol, 15 mL/mol, 10.1 mL/mol, 5.1 mL/mol, 2.5 mL/mol, etc. In some embodiments, the feedstream to solvent ratio is about 15 mL/mol. In some embodiments, the feedstream to solvent ratio is about 15.2 mL/mol. In some embodiments, the scalants in the solid phase include hydroxides, carbonates, phosphates, sulfates, etc. In some embodiments, the scalants in the solid phase include $Ca(OH)_2$, $CaCO_3$, $FeCO_3$, $Mg(OH)_2$, $MgCO_3$, $MnCO_3$, $SrCO_3$, $BaSO_4$, $CaSO_4$, $MgSO_4$, $SrSO_4$, alkali metal salts, e.g., NaCl, or combinations thereof. In some embodiments, the solid phase separated at step 112 is recycled or sold as a product, e.g., for use in other processes/products.

At 114, the water-in-solvent extract component is separated from the raffinate component. In some embodiments, separation 114 occurs via a decanting process. At 116, the water-in-solvent extract component is heated to a temperature $T_H$. In some embodiments, temperature $T_H$ is between about 40° C. and about 80° C. In some embodiments, temperature $T_H$ is about 70° C. In some embodiments, the water-in-solvent extract component is heated and/or maintained at temperature $T_H$ via any suitable heat source, including external heat sources, recycled heat, heat exchangers, etc. In some embodiments, the heat source is a low-grade thermal source. In some embodiments, the heat source is waste heat, renewable energy sources, e.g., wind, solar, hydrothermal, etc., or combinations thereof. Because the solubility of the water in the water-in-solvent extract component decreases when temperature increases, the temperature swing from $T_L$ to $T_H$ drives a phase separation in the water-in-solvent extract component. The result is a biphasic mixture of dewatered solvent, the water having come out of solution by the increase in temperature, and descaled water, the scalants having been previously removed by precipitation and/or removal of the raffinate component. At 118, the dewatered solvent is separated from the descaled water. In some embodiments, the descaled water includes less than about 15%, less than about 10%, or less than about 5% weight percent total dissolved solids. In some embodiments, the descaled water separated at step 118 is recycled or sold as a product for use in other processes. In some embodiments, the descaled water is further processed to further reduce total dissolved solids in the water, e.g., via a reverse osmosis process.

At 120, the dewatered solvent component is cooled from temperature $T_H$. In some embodiments, the dewatered solvent component is cooled 120 from temperature $T_H$ to temperature $T_L$. As will be discussed in greater detail below, in some embodiments, heat lost in the cooling of the dewatered solvent component (as well as the descaled water component) from $T_H$ can be recycled. In some embodiments, the heat is recycled in method 100, e.g., at step 116, or a separate process. At 122, the dewatered solvent component is combined with the feedstream, e.g., for use at one of steps 104, 106, or 108. In some embodiments, method 100 is a continuous or substantially continuous process. In some embodiments, method 100 is a semi-batch process. In some embodiments, method 100 is a batch or substantially batch process.

Figure 2:
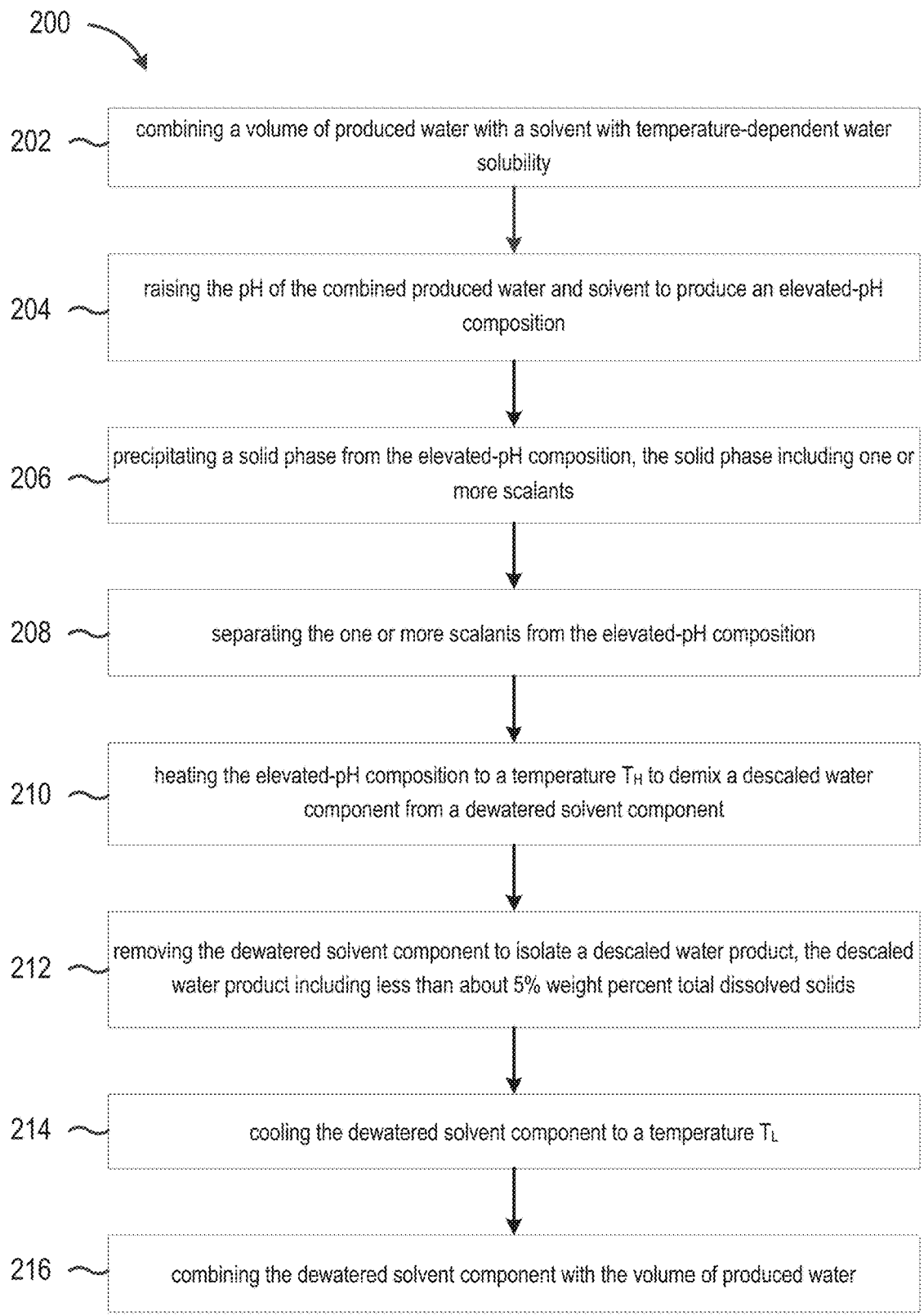
FIG. 2 is a chart of a method of producing a descaled water product according to some embodiments of the present disclosure.

Referring now to FIG. 2, some embodiments of the present disclosure are directed to a method 200 of producing a descaled water product. In some embodiments, at 202, a volume of produced water is combined with one or more solvents. In some embodiments, the volume of produced water to solvent ratio is less than about 25.3 mL/mol, 20.2 mL/mol, 15 mL/mol, 10.1 mL/mol, 5.1 mL/mol, 2.5 mL/mol, etc. As discussed above, the one or more solvents have temperature-dependent water solubility. In some embodiments, the solvent includes aliphatic amines, cyclic amines, pyridines, piperidines, glycol ethers, or combinations thereof. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof. As discussed above, in some embodiments, the volume of produced water includes a plurality of soluble scalants, e.g., salts. In some embodiments, the volume of produced water includes produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof. In some embodiments, the volume of produced water includes a hypersaline solution, e.g., 1M-5M+ NaCl solutions, for desalination. In the some embodiments, the total dissolved solids in the feedstream is greater than about 60,000 ppm, 70,000 ppm, 80,000 ppm, 90,000 ppm, 100,000 ppm, 110,000 ppm, 120,000 ppm, 130,000 ppm, 140,000 ppm, 150,000 ppm, 160,000 ppm, 170,000 ppm, 180,000 ppm, 190,000 ppm, 200,000 ppm, 210,000 ppm, 220,000 ppm, 230,000 ppm, 240,000 ppm, 250,000 ppm, 260,000 ppm, 270,000 ppm, 280,000 ppm, 290,000 ppm, 300,000 ppm, etc. In some embodiments, the one or more scalants include minerals, metals, etc., or combinations thereof. In some embodiments, the scalants include hydroxides, carbonates, phosphates, sulfates, etc. In some embodiments, the scalants include $Ca(OH)_2$, $CaCO_3$, $FeCO_3$, $Mg(OH)_2$, $MgCO_3$, $MnCO_3$, $SrCO_3$, $BaSO_4$, $CaSO_4$, $MgSO_4$, $SrSO_4$, alkali metal salts, e.g., NaCl, or combinations thereof.

At 204, the pH of the combined produced water and solvent is raised to produce an elevated-pH composition. In some embodiments, the pH is raised 204 by the solvent. In some embodiments, the pH is raised 204 via the addition of a supplemental basic component. Without wishing to be bound by theory, the solubility of scalants found in the produced water can be pH-dependent, e.g., with salts being less soluble in more alkaline conditions. Thus, as the pH of the solution increases, thermodynamic equilibrium is driven to induce formation of a solid phase.

At 206, a solid phase is precipitated from the elevated-pH composition, the solid phase including one or more of the scalants. At 208, the one or more scalants are separated from the elevated-pH composition, e.g., via sieving with a membrane. At 210, the elevated-pH composition is heated to a temperature $T_H$ to demix a descaled water component from a dewatered solvent component. At 212, the dewatered solvent component is removed to isolate a descaled water product. In some embodiments, the descaled water product includes less than about 15%, less than about 10%, or less than about 5% weight percent total dissolved solids.

At 214, the dewatered solvent component is cooled. In some embodiments, the dewatered solvent component is cooled 214 to temperature $T_L$. As will be discussed in greater detail below, in some embodiments, heat lost in the cooling of the dewatered solvent component (as well as the descaled water component) from $T_H$ can be recycled. In some embodiments, the heat is recycled in method 200, e.g., at step 210, or a separate process. At 216, the dewatered solvent component is combined with the volume of produced water, e.g., for use in steps 202 and/or 204. In some embodiments, method 200 is a continuous or substantially continuous process. In some embodiments, method 200 is a semi-batch process. In some embodiments, method 200 is a batch or substantially batch process.

Figure 3:
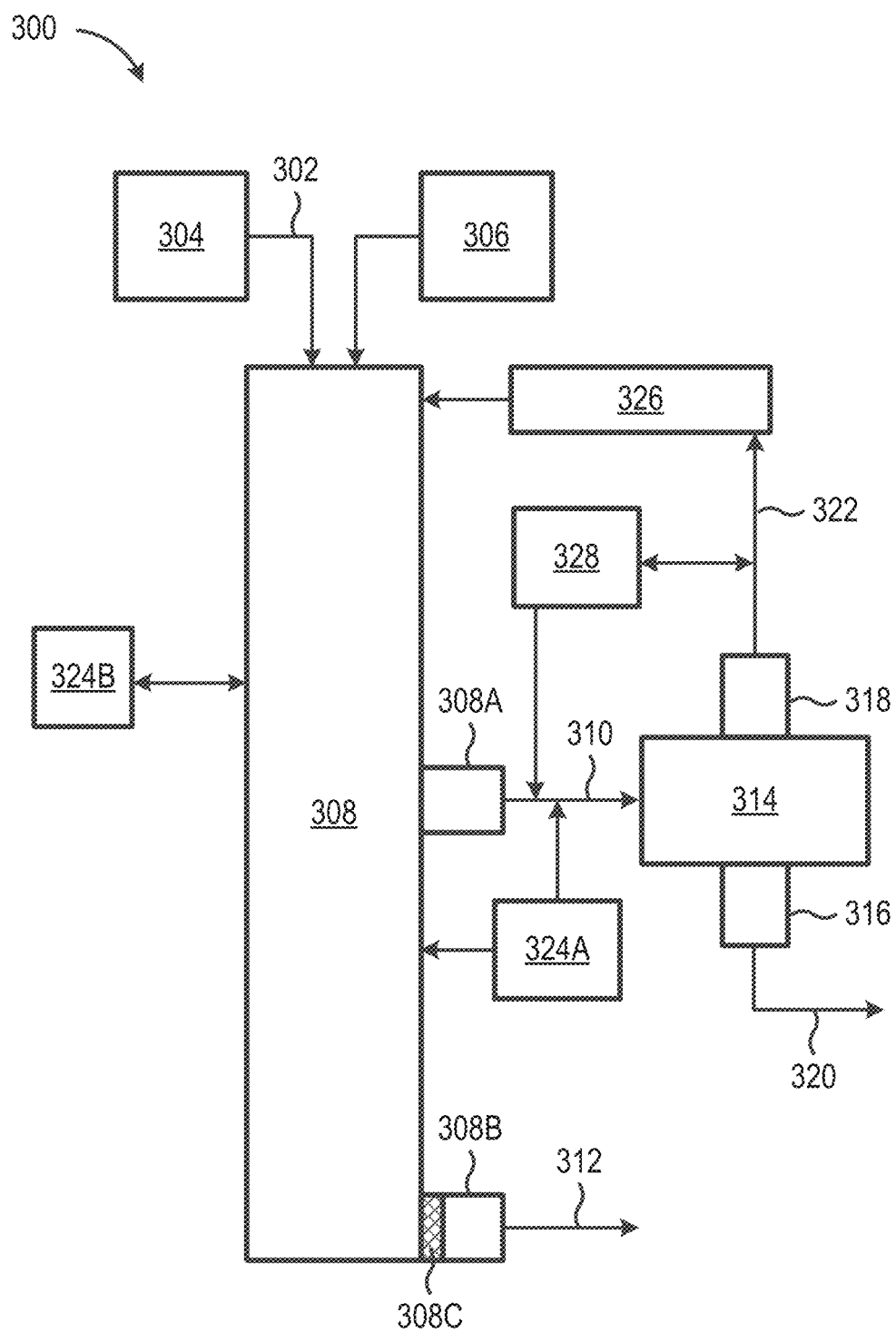
FIG. 3 is a schematic representation of a system of performing TSSE, e.g., descaling/desalination of high-salinity brines/produced waters according to some embodiments of the present disclosure.

Referring now to FIG. 3, some embodiments of the present disclosure are directed to a system 300 of performing temperature swing solvent extraction, e.g., descaling/desalination of produced water/high-salinity brine. In some embodiments, system 300 includes a feedstream 302 in fluid communication with a fluid source 304. In some embodiments, fluid source 304 is from any suitable source, e.g., existing in the natural environment, effluent from industrial processes, etc. In some embodiments, fluid source 304, and thus feedstream 302, includes brines, produced waters, or combinations thereof. In some embodiments, fluid source 304 includes high-salinity brine, produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof. In some embodiments, fluid source 304 includes a fluid having a total dissolved solids greater than about 60,000 ppm, 70,000 ppm, 80,000 ppm, 90,000 ppm, 100,000 ppm, 110,000 ppm, 120,000 ppm, 130,000 ppm, 140,000 ppm, 150,000 ppm, 160,000 ppm, 170,000 ppm, 180,000 ppm, 190,000 ppm, 200,000 ppm, 210,000 ppm, 220,000 ppm, 230,000 ppm, 240,000 ppm, 250,000 ppm, 260,000 ppm, 270,000 ppm, 280,000 ppm, 290,000 ppm, 300,000 ppm, etc.

In some embodiments, system 300 includes a solvent source 306. In some embodiments, solvent source 306 includes one or more solvents with temperature-dependent water solubility. As discussed above, in some embodiments, the solvent is basic. In some embodiments, the solvent includes one or more hydrophilic moieties in a mainly hydrophobic structure. In some embodiments, the solvent is an amine solvent, e.g., a primary, secondary, or tertiary amine solvent. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof.

In some embodiments, system 300 includes an extractor 308 in fluid communication with feedstream 302 and solvent source 306. In some embodiments, system 300 includes a plurality of extractors 308, e.g., arranged in parallel, arranged in series, or combinations thereof. In some embodiments, feedstream 302 and solvent from solvent source 306 are combined in extractor 308. In some embodiments, the ratio of feedstream 302 to solvent in extractor 308 is less than about 25.3 mL/mol, 20.2 mL/mol, 15 mL/mol, 10.1 mL/mol, 5.1 mL/mol, 2.5 mL/mol, etc. As discussed above, in some embodiments, feedstream 302 and solvent are combined at a temperature $T_L$. In some embodiments, feedstream 302 and solvent are combined at different temperatures and brought to a temperature $T_L$. In some embodiments, $T_L$ is below about 20° C. In some embodiments, $T_L$ is below about 10° C. In some embodiments, $T_L$ is about 5° C. At temperature $T_L$, water from feedstream 302 favorably partitions into the solvent phase, producing a raffinate component that retains the scalants from the liquid feedstream. In some embodiments, the raffinate component includes an aqueous phase, a solid phase, or combinations thereof.

Further, as discussed above, upon combination feedstream 302 and solvent from solvent source 306, liquid from the feedstream is extracted into the solvent to form a water-in-solvent extract component. In some embodiments, extractor 308 includes at least a first outlet 308A. In some embodiments, extractor 308B includes a second outlet 308B. In some embodiments, a water-in-solvent extract outlet stream 310 is in communication with first outlet 308A. In some embodiments, a raffinate outlet stream 312 is in communication with second outlet 308B. In some embodiments, raffinate outlet stream 312 includes an aqueous phase, a solid phase, or combinations thereof. In some embodiments, extractor 308 includes one or more membranes 308C configured to isolate solid phase products, e.g., from the raffinate component. Membranes 308C can be of any suitable composition and pore-size to isolate the components of a particular solid phase. In some embodiments, membranes 308C are microporous, nanoporous, etc. In some embodiments, a membrane 308C is positioned in second outlet 308B. In some embodiments, raffinate outlet stream 312 includes an aqueous phase, any solid phase having been removed prior to exiting extractor 308, e.g., via 308B.

Extractor 308 can be of any suitable shape and volume to accommodate a desired volume of liquid, e.g., feedstream 302 in one or more solvents. In one exemplary embodiment, extractor 308 has a generally cylindrical shape, e.g., a liquid-liquid extraction column. Feedstream 302 is introduced at the top of extractor 108 and contacts solvent therein at temperature $T_L$. The solvent progressively extracts water from the denser aqueous phase as it sinks toward the bottom. Scalants precipitate out and ultimately settle at the bottom of extractor 308, and are subsequently sieved off by membranes 302C as liquid streams, e.g., 308A and 308B, exit the extractor.

In some embodiments, system 300 includes a separator 314 in fluid communication with water-in-solvent extract outlet stream 310. Separator 314 is configured to demix a descaled water component from a dewatered solvent component. In some embodiments, separator 314 includes at least a third outlet 316 and a fourth outlet 318. In some embodiments, a descaled water component outlet stream 320 is in communication with third outlet 316 to remove the descaled water component from separator 314. As discussed above, in some embodiments, descaled water component outlet stream 320 includes less than about 5% weight percent total dissolved solids. In some embodiments, a dewatered solvent component outlet stream 322 is in communication with fourth outlet 318 to remove the dewatered solvent component from separator 314.

In some embodiments, system 300 includes a temperature controller 324A. In some embodiments, temperature controller 324A is in thermal communication with extractor 308 and/or water-in-solvent extract outlet stream 310, e.g., via a heat source, cooling system, etc. In some embodiments, temperature controller 324A is in thermal communication with raffinate outlet stream 312, separator 314, descaled water component outlet stream 320, dewatered solvent component outlet stream 322, dewatered solvent recycle conduit 326, feedstream 302, solvent stream, or combinations thereof. In some embodiments, temperature controller 324A is in thermal communication with water-in-solvent extract outlet stream 310 via separator 314. Temperature controller 324A is configured to maintain a predetermined temperature in extractor 308, e.g., temperature $T_L$, as well as in water-in-solvent extract outlet stream 310, e.g., temperature $T_H$. The heat input to system 100 can be supplied from low-grade thermal sources. In some embodiments, the heat is supplied from renewable energy sources, e.g., wind, solar, hydrothermal, etc., or combinations thereof.

In some embodiments, system 300 includes a pH controller 324B. In some embodiments, pH controller 324B is in communication with extractor 308. In some embodiments, pH controller 324B is in communication with water-in-solvent extract outlet stream 310, raffinate outlet stream 312, separator 314, descaled water component outlet stream 320, dewatered solvent component outlet stream 322, dewatered solvent recycle conduit 326, feedstream 302, solvent stream, or combinations thereof pH controller 324B is configured to maintain a predetermined pH in components of system 300, e.g., a lower pH in raffinate outlet stream 312, but a higher pH in extractor 108. In some embodiments, pH controller 324B increases the pH in a component of system 300 via addition of additional solvent, a basic component, or combinations thereof.

In some embodiments, system 300 includes a dewatered solvent recycle conduit 326 in fluid communication with dewatered solvent component outlet stream 322 and extractor 308. Dewatered solvent recycle conduit 326 is configured to direct the dewatered solvent component outlet stream 322 to extractor 308 for recycling, e.g., in embodiments where extractor 108 is operated in a continuous or semi-continuous manner. In some embodiments, system 300 includes one or more heat exchangers 328 In some embodiments, heat exchangers 328 are in thermal communication with water-in-solvent extract outlet stream 310, raffinate outlet stream 312, separator 314, descaled water component outlet stream 320, dewatered solvent component outlet stream 322, dewatered solvent recycle conduit 326, extractor 308, feedstream 302, solvent stream, or combinations thereof. Heat exchangers 328 are configured to recycle heat to reduce the overall energy cost of system 100. By way of example, in some embodiments, heat exchanger 328 extracts heat from dewatered solvent component outlet stream 322 and returns it to water-in-solvent extract outlet stream 310 to help demix the water and solvent components of that stream.

System 300 is advantageous for use both in front of plant and back of plant implementations. By way of example, in front of plant implementations, system 300 can be used to treat fluids existing in nature to decontaminate those fluids, isolate impurities for subsequent sale as a product, isolate impurities for use in industrial processes to produce other products, etc., or combinations thereof. By way of further example, in back of plant implementations, system 300 can be used to treat produced waters generated by industrial processes, either for reuse in the industrial processes, isolate byproduct impurities for subsequent sale as a product unto itself, decontaminate produced waters so as to provide less harmful wastes into the environment, etc., or combinations thereof.

Figure 4:
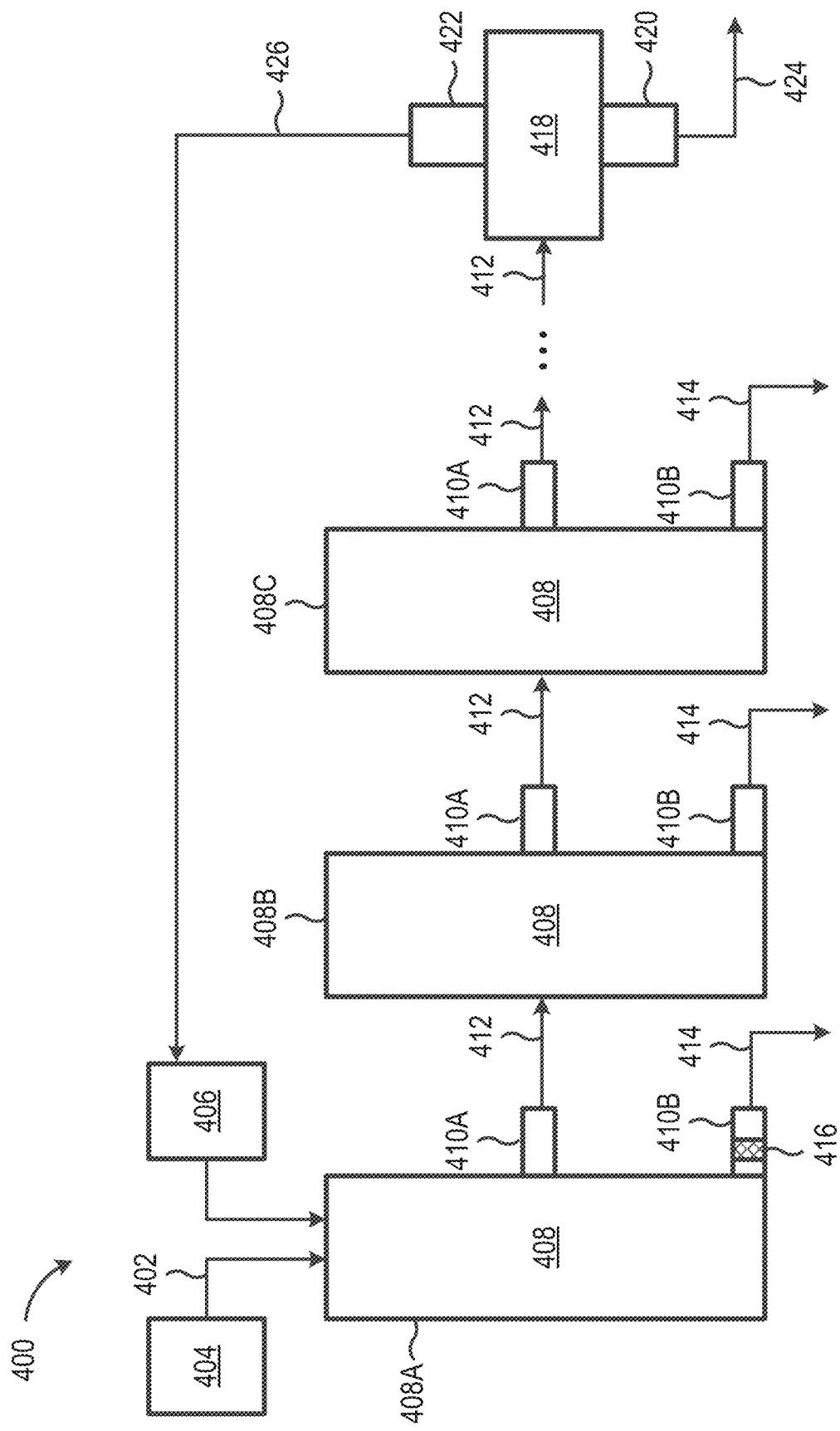
FIG. 4 is a schematic representation of performing temperature swing solvent extraction-stepwise release (TSSE-SR) desalination of hypersaline brines according to some embodiments of the present disclosure.

Referring now to FIG. 4, some embodiments of the present disclosure are directed to a system 400 for desalinating a feedstream utilizing temperature swing solvent extraction-stepwise release (TSSE-SR). In some embodiments, system 400 includes a feedstream 402 in fluid communication with a fluid source 404. As discussed above, in some embodiments, fluid source 404 is from any suitable source, e.g., existing in the natural environment, effluent from industrial processes, etc. In some embodiments, fluid source 404, and thus feedstream 402, includes brines, produced waters, or combinations thereof. In some embodiments, fluid source 404 includes high-salinity brine, produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof.

In some embodiments, system 400 includes a solvent source 406. As discussed above, in some embodiments, solvent source 406 includes one or more solvents with temperature-dependent water solubility. As discussed above, in some embodiments, the solvent is basic. In some embodiments, the solvent includes one or more hydrophilic moieties in a mainly hydrophobic structure. In some embodiments, the solvent is an amine solvent, e.g., a primary, secondary, or tertiary amine solvent. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof.

In some embodiments, system 400 includes an extractor 408 in fluid communication with feedstream 402 and solvent source 406. In some embodiments, system 400 includes a plurality of extractors 408, e.g., arranged in parallel, arranged in series, or combinations thereof. In some embodiments, feedstream 402 and solvent from solvent source 406 are combined, e.g., in a first extractor 408A. In some embodiments, the ratio of feedstream 402 to solvent in first extractor 408A is less than about 25.3 mL/mol, 20.2 mL/mol, 15 mL/mol, 10.1 mL/mol, 5.1 mL/mol, 2.5 mL/mol, etc.

In some embodiments, feedstream 402 and solvent are combined at a temperature $T_1$. In some embodiments, $T_1$ is below about 20° C. In some embodiments, $T_1$ is about 16° C. In some embodiments, at the initial temperature, the solvent is hygroscopic and absorbs water while partially rejecting salt.

As discussed above, the water/solvent mixture separates into two immiscible liquid phases in first extractor 408A, a water-in-solvent component $E_1$ and a raffinate component $R_1$, that are physically separated. In some embodiments, the water-in-solvent component $E_1$ and raffinate component $R_1$ are separated via decanting, other suitable separation process, or combinations thereof. In some embodiments, the raffinate component at this stage, $R_1$, is concentrated brine. In some embodiments, the water-in-solvent component at this stage, $E_1$, is a mixture including solvent, water, small amounts of salts, etc.

In some embodiments, water-in-solvent component $E_1$ is then heated or cooled, e.g., from $T_1$, to a final temperature $T_F$. In some embodiments, water-in-solvent component $E_1$ is first heated or cooled to a second temperature, e.g., to $T_2$, and then subsequently heated or cooled to $T_F$. In some embodiments, the heating or cooling of $E_1$ occurs in a series of extractors, as will be discussed in greater detail below. In some embodiments, the change to the second temperature induces the formation of an additional aqueous raffinate component, e.g., $R_2$. Without wishing to be bound by theory, salts are polar, and thus salts remaining in water-in-solvent component $E_1$ at $T_1$ preferentially partition into aqueous raffinate component at the second temperature, e.g., into $R_2$ at $T_2$. In some embodiments, the additional raffinate component is then removed, leaving another water-in-solvent component, e.g., $E_2$, with reduced salt content. In some embodiments, this subsequent water-in-solvent component $E_2$ is heated or cooled to induce formation of subsequent water-in-solvent components and raffinate components, e.g., $E_3$ and $R_3$, as will be discussed in greater detail below.

Still referring to FIG. 4, in some embodiments, system 400 includes a plurality of extractors, e.g., 408A, 408B, 408C, etc. In some embodiments, water-in-solvent component is heated or cooled in a series of those additional extractors. In some embodiments, the plurality of extractors are in fluid communication with each other via one or more conduits. As discussed above, upon combination of feedstream 402 and solvent from solvent source 406, liquid from the feedstream is extracted into the solvent to form the water-in-solvent extract component, e.g., $E_1$. In some embodiments, extractor 408, e.g., 408A, includes at least a first outlet 410A. In some embodiments, extractor 408 includes a second outlet 410B. In some embodiments, a water-in-solvent extract outlet stream 412 is in communication with first outlet 410A. In some embodiments, a water-in-solvent extract outlet stream 412, e.g., $E_1$, is in communication with a subsequent extractor, e.g., 408B. In some embodiments, a raffinate outlet stream 414 is in communication with second outlet 410B. In some embodiments, raffinate outlet stream 414 includes an aqueous phase, a solid phase, or combinations thereof.

In some embodiments, the heating/cooling of the water-in-solvent component and removal raffinate component are performed one or more times, i.e., there are one or more "stages" of mixture heating in and raffinate component removal from a series of extractors, 408A, 408B, 408C, etc., via a series of water-in-solvent extract outlet streams 412 to communicate water-in-solvent extract component, e.g., $E_1$, $E_2$, $E_3$, etc., from extractor to extractor and a series of raffinate outlet streams 414 to remove raffinate components, e.g., $R_1$, $R_2$, $R_3$, etc., from each extractor. In some embodiments, the heating/cooling of the water-in-solvent component and removal raffinate component are performed a plurality of times. In some embodiments, water-in-solvent component $E_1$ is heated or cooled, e.g., from $T_1$, to at least one intermediate temperature $T_N$. In some embodiments, and as discussed above, $T_N$ is chosen so that it induces the formation of an aqueous raffinate component, RN. Salts remaining in the mixture at $T_N$ preferentially partition into RN. RN is then removed, leaving the extract, $E_N$. In some embodiments, $E_N$ is then heated or cooled to another intermediate temperature $T_N$, forming yet another raffinate component RN and another water-in-solvent component $E_N$, which are then separated, and so on. RN stages include a small portion of the water remaining in the mixture but are concentrated in salts. Experiments have shown that RN aqueous phases can be more concentrated than the first aqueous phase, $R_1$, or the feedstream 402. Removing RN from the desalination process decreases the final product water salinity, thus producing higher quality product water.

In some embodiments, any number of heating or cooling stages to intermediate temperatures $T_N$ can be used until finally the water-in-solvent component $E_N$ arrives at final temperature $T_F$. In some embodiments, the temperature swing from $T_1$ to $T_F$ can be accomplished as a series of discrete temperature steps. In some embodiments, the number of heating or cooling stages to intermediate temperatures $T_N$ is greater than 1. In some embodiments, the number of heating or cooling stages to intermediate temperatures $T_N$ is greater than 2. In some embodiments, the number of heating or cooling stages to intermediate temperatures $T_N$ is greater than 3. In some embodiments, the number of heating or cooling steps to intermediate temperatures $T_N$ is greater than 5. In some embodiments, the number of heating or cooling steps to intermediate temperatures $T_N$ is greater than 10. In some embodiments, the temperature swing from $T_1$ to $T_F$ can be accomplished as a continuous temperature gradient, e.g., in a single extractor or a series of extractors.

In some embodiments, extractor 408, e.g., 408A, includes one or more membranes 416 configured to isolate solid phase products, e.g., from the raffinate component. In some embodiments, a membrane 416 is positioned in second outlet 410B. Membrane 416 can be of any suitable composition and pore-size to isolate the components of a particular solid phase. In some embodiments, membrane 416 is microporous, nanoporous, etc. In some embodiments, raffinate outlet stream 414 includes an aqueous phase, any solid phase having been removed prior to exiting extractor 408, e.g., via 410B, etc.

In some embodiments, system 400 includes a separator 418 in fluid communication with a water-in-solvent extract outlet stream 412. Separator 418 is configured to demix a descaled water component from a dewatered solvent component. In some embodiments, separator 418 includes at least a third outlet 420 and a fourth outlet 422. In some embodiments, a descaled water component outlet stream 424 is in communication with third outlet 420 to remove the descaled water component from separator 418. As discussed above, in some embodiments, descaled water component outlet stream 424 includes less than about 5% weight percent total dissolved solids. In some embodiments, a dewatered solvent component outlet stream 426 is in communication with fourth outlet 422 to remove the dewatered solvent component from separator 418. In some embodiments, at least a portion of dewatered solvent component outlet stream 426 is recycled back to extractors 408, e.g., via solvent source 406

Additional aspects from system 300 not explicitly discussed with respect to system 400, e.g., temperature controller 324, heat exchangers 328, etc., may also be configured for use with system 400.

Figure 5:
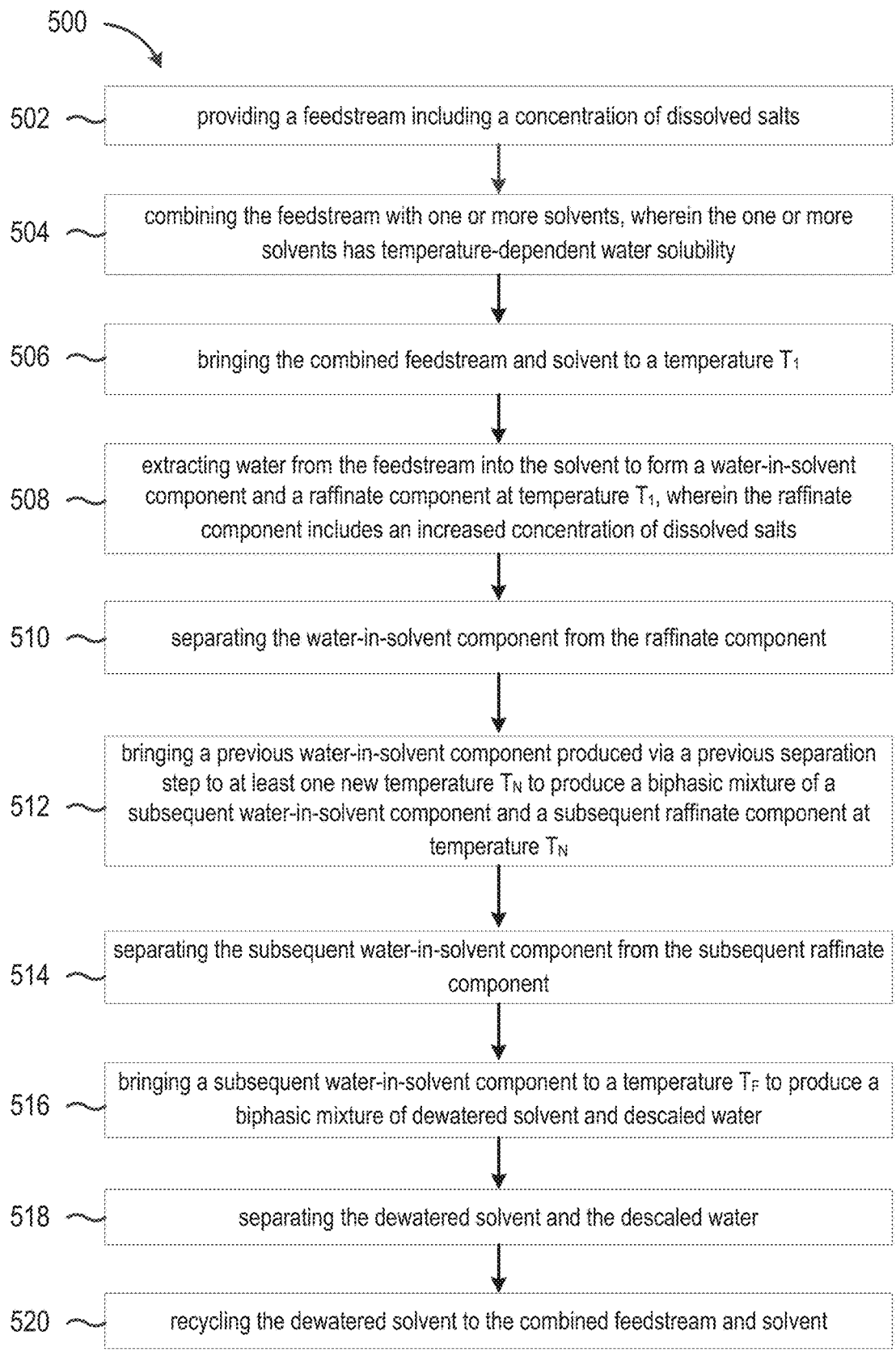
FIG. 5 is a chart of a method of producing a descaled water product according to some embodiments of the present disclosure.

Referring now to FIG. 5, some embodiments of the present disclosure are directed to a method 500 of performing temperature swing solvent extraction-stepwise release (TSSE-SR) desalination of hypersaline brines. As discussed above, in some embodiments, the feedstream includes brines, produced waters, or combinations thereof. In some embodiments, the feedstream includes high-salinity brine, produced water and flowback from oil and gas industry, fluegas desulfurization wastewater, inland desalination concentrates, landfill leachate, waste streams of zero/minimum liquid discharge operations, waste effluents from thermoelectric power plants, discharges of coal-to-chemicals facilities, etc., or combinations thereof. At 502, a feedstream including a concentration of dissolved salts is provided. At 504, the feedstream is combined with one or more solvents. As discussed above, in some embodiments, the one or more solvents has temperature-dependent water solubility. In some embodiments, the solvent includes aliphatic amines, cyclic amines, pyridines, piperidines, glycol ethers, or combinations thereof. In some embodiments, the solvent includes diisopropylamine (DIPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof. At 506, the combined feedstream and solvent is brought to a temperature $T_1$. In some embodiments, $T_1$ is below about 20° C. In some embodiments, $T_1$ is about 16° C. At 508, water is extracted from the feedstream into the solvent to form a water-in-solvent component and a raffinate component at temperature $T_1$. As discussed above, the raffinate component includes an increased concentration of dissolved salts. At 510, the water-in-solvent component is separated from the raffinate component. At 512, a previous water-in-solvent component produced via a previous separation step is brought to at least one new temperature $T_N$ to produce a biphasic mixture of a subsequent water-in-solvent component and a subsequent raffinate component at temperature $T_N$. At 514, the subsequent water-in-solvent component is separated from the subsequent raffinate component. In some embodiments, steps 512 and 514 are repeated 2 or more times. At 516, a subsequent water-in-solvent component is brought to a temperature $T_F$ to produce a biphasic mixture of dewatered solvent and descaled water. In some embodiments, $T_F$ is between about 40° C. and about 80° C. In some embodiments, $T_F$ is about 70° C. In some embodiments, the temperature swing from $T_1$ to $T_F$ is a continuous temperature gradient. At 518, the dewatered solvent and the descaled water are separated. At 520, the dewatered solvent is recycled to the combined feedstream and solvent.

Example

Continuous operation of systems and methods of the present disclosure were simulated by semibatch experiments with repeated extraction cycles, using DIPA as the solvent and 5.0 M NaCl solution as the hypersaline feed. To simulate solvent regeneration in continuous operation, the DIPA solvent was preloaded with DI water at about 6.4 w/w % and consecutively reused in three repeated TSSE cycles. 1.5 mL of a fresh brine (5.0 M NaCl) was introduced into 60 g of DIPA solvent in each extraction cycle to achieve a brine to solvent ratio of 2.5 mL/mol. The precipitated solids were sieved off with a microporous membrane under vacuum filtration and then weighed after drying. The product water collected from each extraction cycle was weighed to evaluate water recovery and analyzed for NaCl and solvent residue concentrations.

Figure 6A:
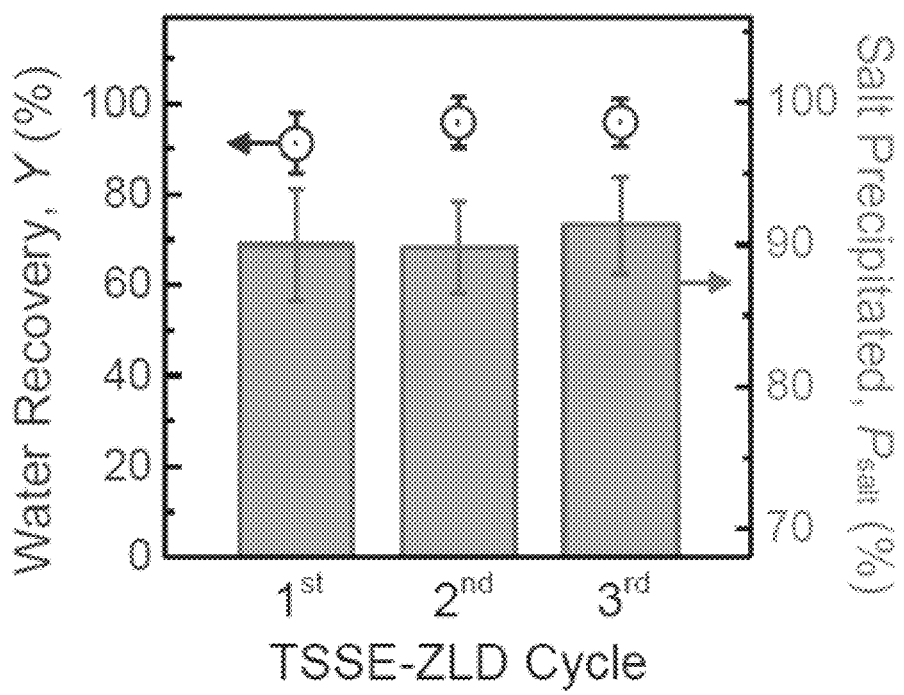
FIG. 6A is a graph portraying water recovery and precipitated salt capabilities of methods and systems according to some embodiments of the present disclosure.
Figure 6B:
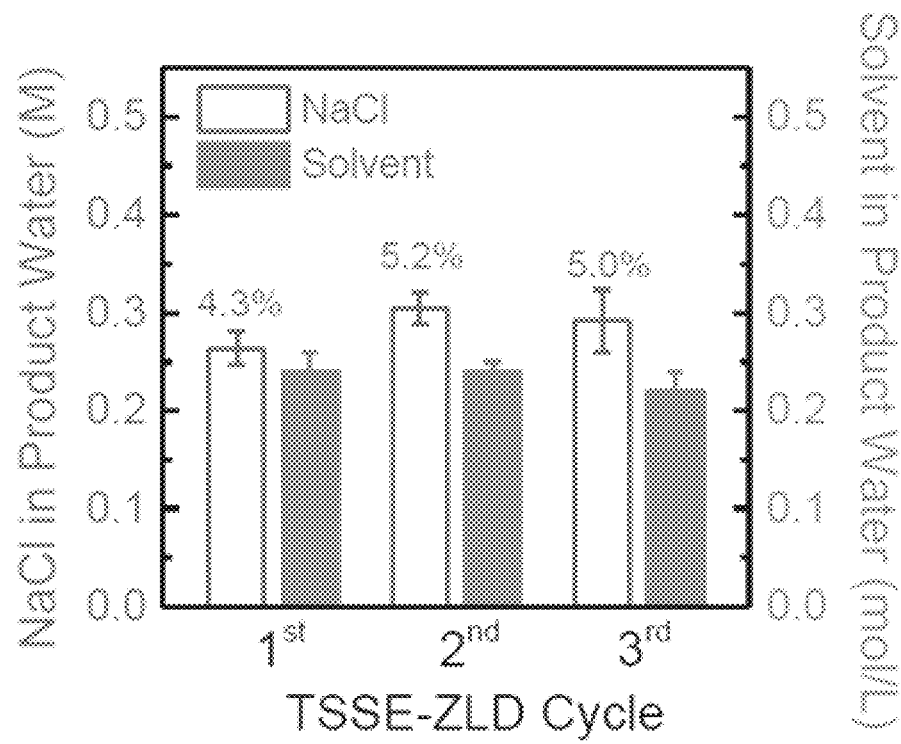
FIG. 6B is a graph portraying compositions of product water treated with methods and systems according to some embodiments of the present disclosure.

Referring now to FIGS. 6A-6B, water recovery, Y, and salt precipitated, $P_{salt}$, of each extraction cycle were evaluated to examine recyclability of the systems and methods of the present disclosure. Water recovery is defined as the weight percent of the product water relative to the initial brine feed. High Y of 91.2, 95.8, and 95.9% were obtained for the 1st, 2nd, and 3rd cycles, respectively. Measured water recoveries were marginally below 100%, even though all the water was extracted from the brine feed in each cycle. Without wishing to be bound by theory, this discrepancy is mainly attributed to conservative sampling of the product water during separation from the biphasic mixture to avoid contamination by the solvent and slight undersaturation of the solvent in the 1st cycle. Y remained practically constant when the solvent was reused for the 2nd and 3rd cycles, indicating that ability of the solvent to extract water from the hypersaline feed is preserved. Almost all the salt in the 5.0 M NaCl brines precipitated out after water was extracted by the solvent and high $P_{salt}$ of ≈91, 90, and 91% were maintained in the 1st, 2nd, and 3rd extraction cycles, respectively. At the end of the last cycle, the DIPA solvent was measured to hold ≈6.5 w/w % water, effectively identical to the initial water content, and thus, further highlighting solvent recyclability in continuous operation.

The product water quality in repeated extraction cycles was assessed for salt concentration and solvent residue content. NaCl concentrations in the product water from each extraction cycle were 0.26, 0.31, and 0.29 M. The product water salt concentrations are markedly lower than the hypersaline feed of 5.0 M NaCl brine (93.8-94.8% reduction) and the amount of salt in the product water corresponds to 4.3, 5.2, and 5.0 w/w % relative to NaCl in the initial brine. Solvent residues in the product water were comparable at about 0.2 mol/L between the extraction cycles investigated.

Osmotic pressure reductions of 93.1-93.9% were also achieved. With substantially lowered TDS concentration and osmotic pressure, the desalted product water can be further polished using conventional techniques, such as reverse osmosis, for post-treatment with much less energy demand and fewer technical constraints, to yield a fit-for-purpose reuse stream and even fresh drinking water. The trace amount of solvent residues can also be recovered from the product water and returned to the cycle to curtail solvent loss.

Figure 7:
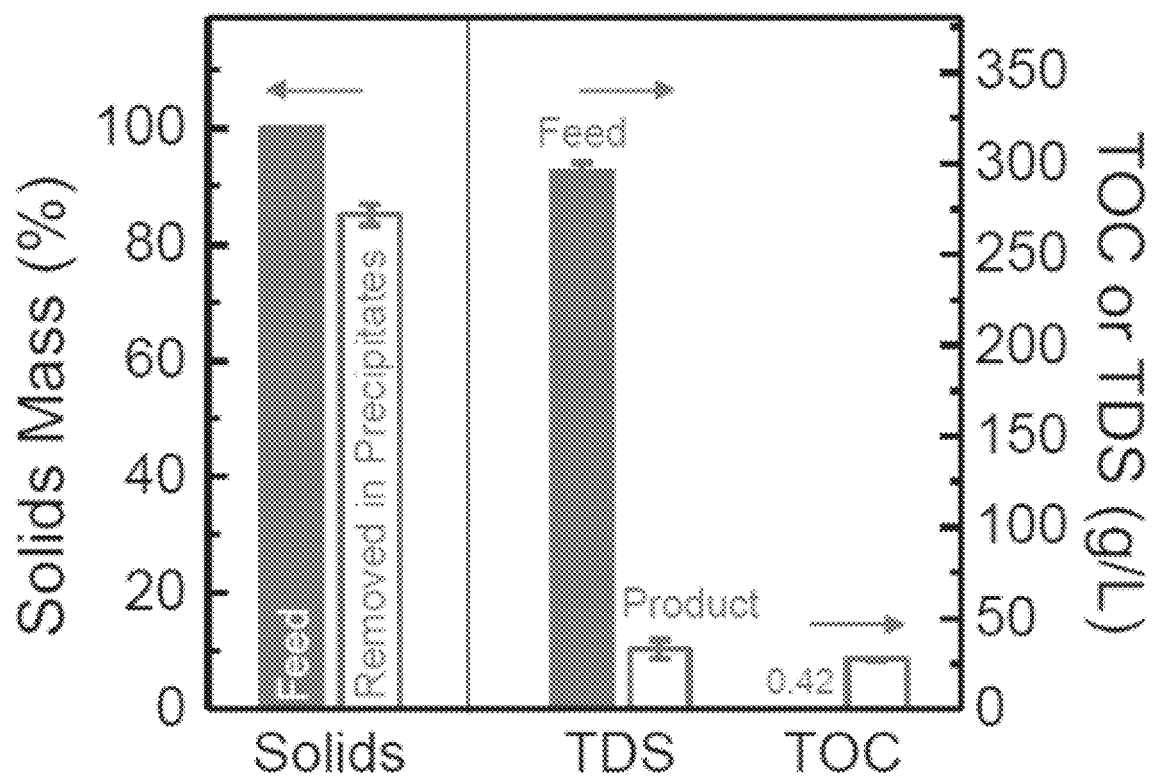
FIG. 7 is a graph portraying solids removal capabilities of methods and systems according to some embodiments of the present disclosure.

Referring now to FIG. 7, the potential of the systems and methods of the present disclosure was further evaluated with an actual field sample. Hypersaline feed was prepared by evaporative concentration of RO effluent from the San Luis plant, CA, which desalinates irrigation drainage water of San Joaquin Valley to reach TDS concentration of ≈295,000 ppm, i.e., approximately equivalent to 5.0 M NaCl brine. Extraction of all the water from the brine sample precipitated ≈85.2% of the dissolved solids, which were removed by filtration. Product water TDS concentration was substantially reduced by −88.8% relative to the feed brine, from 295.4 g/L to 33.1 g/L. Total organic carbon (TOC) concentration of the product water (0.27 mol/L) was comparable to those obtained from semibatch TSSE-ZLD experiments with 5.0 M NaCl solution as brine feed, which had no initial organic content, indicating that TOC in the product water is mostly attributable to the solvent that has partitioned to the aqueous phase.

Figure 8A:
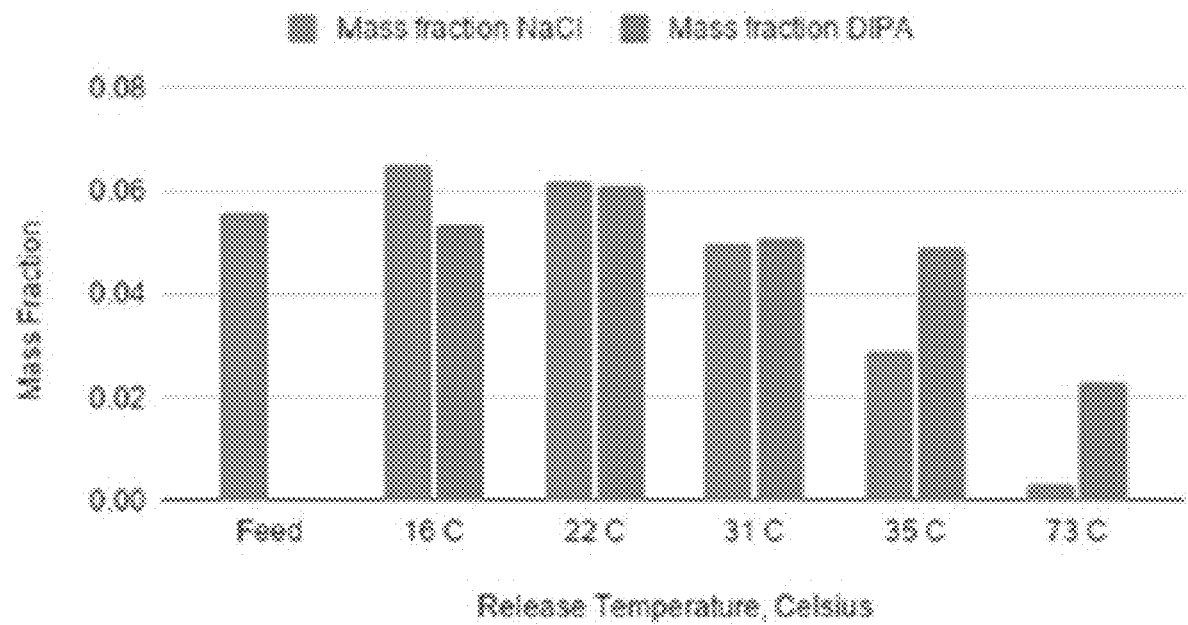
FIG. 8A is a graph portraying the mass fraction of DIPA and NaCl in the aqueous phase of a TSSE-SR experiment using DIPA and NaCl with three stepwise extractions.
Figure 8B:
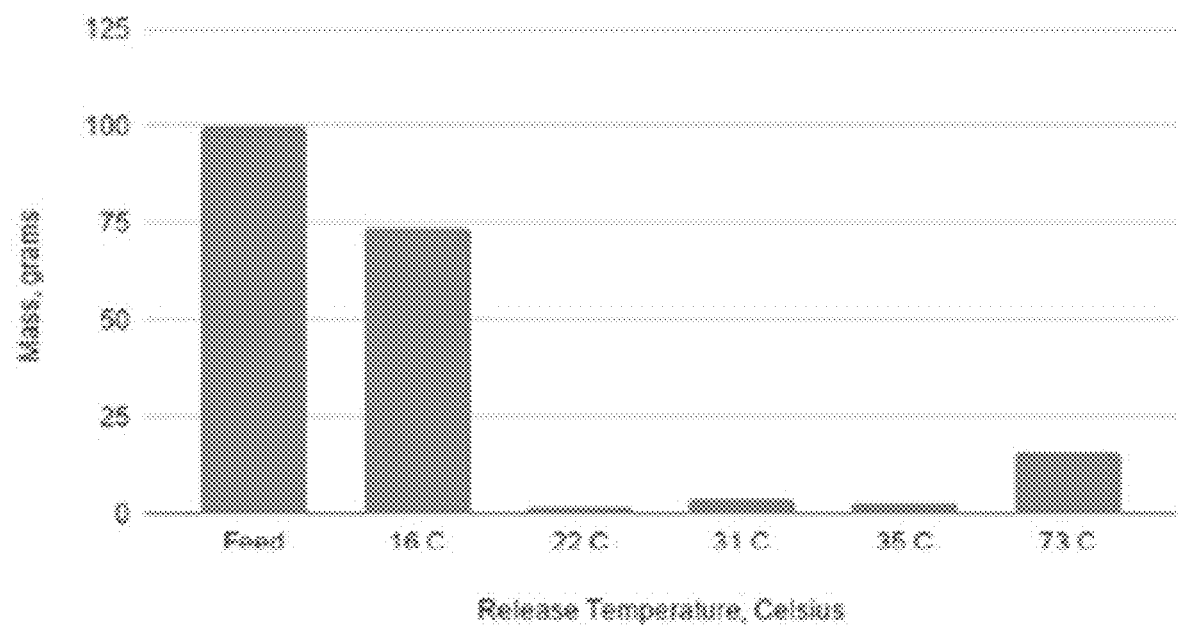
FIG. 8B is a graph portraying mass of the aqueous phase that was released at each intermediate temperature in a TSSE-SR experiment on 1.0 mol/L NaCl using DIPA with three stepwise extractions.

Referring now to FIGS. 8A-8B, in an exemplary embodiment, a diisopropylamine (DIPA)-water-sodium chloride (NaCl) TSSE-SR desalination system was constructed. Experiments were performed using 100.0 g of DIPA mixed with 100.0 g of 5.6 wt % NaCl$_{(aq)}$ solution (1 mol/L NaCl solution). Performing multiple releases, with $T_1$=16° C., $T_2$=22° C., $T_3$=31° C., $T_4$=35° C., $T_F$=$T_5$=70° C. produced a final product water, $R_5$, with 0.30 wt. % NaCl. A comparison TSSE system using the same feed and outer operating temperatures without multiple release steps produced water with 0.76 wt. % NaCl. Without wishing to be bound by theory, the stepwise release process was responsible for a greater than factor-of-two decrease in salt contents.

It is apparent that the intermediate aqueous phases, performed at 22° C., 31° C., and 35° C., included substantially higher concentrations of salt than the final product water (see FIG. 8A). These intermediate aqueous phases were only a small portion of the overall mass of product water (see FIG. 8B). By removing the intermediate aqueous phases from the process, a large portion of the contaminating salt was removed, leading to superior quality product water.

Methods and systems of the present disclosure are advantageous to treat feedstreams with high total TDS. Even feedstreams with TDS approaching 300,000 ppm can be treated, with final concentrations having less than 5% total dissolved solids. These results are achieved without the high-grade thermal energy requirements associated with evaporative phase change properties, i.e., steam that is >100° C. Temperature swing solvent extraction is uniquely suited for the desalination of hypersaline brines, a segment of intensifying environmental importance but not accessible by RO and handicapped by intrinsically poor energy efficiencies of evaporative methods. The technology is not restricted by feed solution properties, unlike membrane-based RO with hydraulic/osmotic pressure limitation. Because TSSE consistent with embodiments of the present disclosure is membrane-less (unlike reverse osmosis) and does not require a phase change of water, i.e., is non-evaporative and not based on evaporative phase-change (dissimilar to distillation), the penalizing energy cost associated with the enthalpy of vaporization is sidestepped and significantly higher energy efficiencies are attainable. As only moderate temperatures are needed (<70° C. in this study), the heat input can be supplied by low-grade thermal sources such as industrial waste heat, shallow-well geothermal heat, and low-concentration solar collectors, further enhancing the sustainability of TSSE. Other solvents with different chemical structures and properties can yield better performances to further expand the prospects of TSSE for energy-efficient and cost-effective desalination of high-salinity brines.

Among the solvents, DIPA exhibited the highest water extraction efficiency whereas ECHA and DMCHA produced water with the lowest salt content and solvent residue content, respectively. Specific performance objectives, such as, high water extraction efficiency, high salt removal, and low solvent loss, can be achieved by rational solvent selection. High water recovery >50% was demonstrated for TSSE desalination of 1.5 M NaCl brine in semi-batch experiments with multiple extraction cycles, highlighting the potential for a scaled-up continuous process. Substantial energy savings over conventional methods were achieved, drastically improving sustainability and enhancing economic feasibility. In some embodiments, the methods and systems of the present disclosure are applied to desalination/dewatering/reuse of hypersaline brines, e.g., produced water from the oil and gas industry, waste streams of minimum/zero liquid discharge operations, inland desalination concentrate, landfill leachate, flue gas desulfurization wastewater, treatment of high-scaling propensity feedwaters, and the like.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A system of performing temperature swing solvent extraction (TSSE) desalination of high-salinity brines, comprising:
   a feedstream in fluid communication with a fluid source, the fluid source including a fluid having a total dissolved solids greater than about 250,000 ppm;
   a solvent source including one or more solvents with temperature-dependent water solubility;
   one or more extractors in fluid communication with the feedstream and the solvent source, the extractor including at least a first outlet and a second outlet;
   a water-in-solvent extract outlet stream in communication with the first outlet;
   a raffinate outlet stream in communication with the second outlet, wherein the raffinate outlet stream includes an aqueous phase and a solid phase;
   a separator in fluid communication with the water-in-solvent extract outlet stream, the separator including at least a third outlet and a fourth outlet;
   a descaled water component outlet stream in communication with the third outlet, the descaled water component including less than about 5% weight percent total dissolved solids;
   a dewatered solvent component outlet stream in communication with the fourth outlet;
   a temperature controller in communication with the one or more extractors and the water-in-solvent extract outlet stream; and
   a dewatered solvent recycle conduit in fluid communication with the dewatered solvent component outlet stream and the one or more extractors, the dewatered solvent recycle conduit configured to direct the dewatered solvent component outlet stream to the extractor,
   wherein the one or more solvents include diisopropylamine (DTPA), N-ethylcyclohexylamine (ECHA), and N,N-dimethylcyclohexylamine (DMCHA), triethylamine (TEA), N-methylcyclohexylamine (nMCHA), N,N-dimethylisopropylamine (DMIPA), or combinations thereof,
   wherein neither of the water-in-solvent extract outlet stream and the raffinate outlet stream are in fluid communication with a membrane separation system or an evaporative phase-change system.

2. The system according to claim 1, wherein a first extractor is maintained at a temperature TL and a final water-in-solvent extract outlet stream in communication with the one or more extractors is heated to a temperature TH, wherein TL is below about 20° C. and TH is between about 40° C. and about 80° C.

3. The system according to claim 2, further comprising at least a second extractor in fluid communication with the first extractor via a first water-in-solvent extract outlet stream, wherein the at least a second extractor is maintained at an intermediate temperature between TL and TH and the first water-in-solvent extract outlet stream is heated to the intermediate temperature.

4. The system according to claim 3, further comprising at least a third extractor in fluid communication with the second extractor, such that the first extractor, the second extractor, and the third extractor are arranged in series,
   wherein the temperature controller is in communication with the first extractor, the second extractor, and the third extractor, and is configured to operate the first extractor at a first temperature, the second extractor at a second temperature, and the third extractor at a third temperature, wherein the second temperature is between the first temperature and the third temperature.

5. The system according to claim 2, wherein the feedstream to solvent ratio in the first extractor is less than about 15 mL/mol.

* * * * *